April 8, 1958

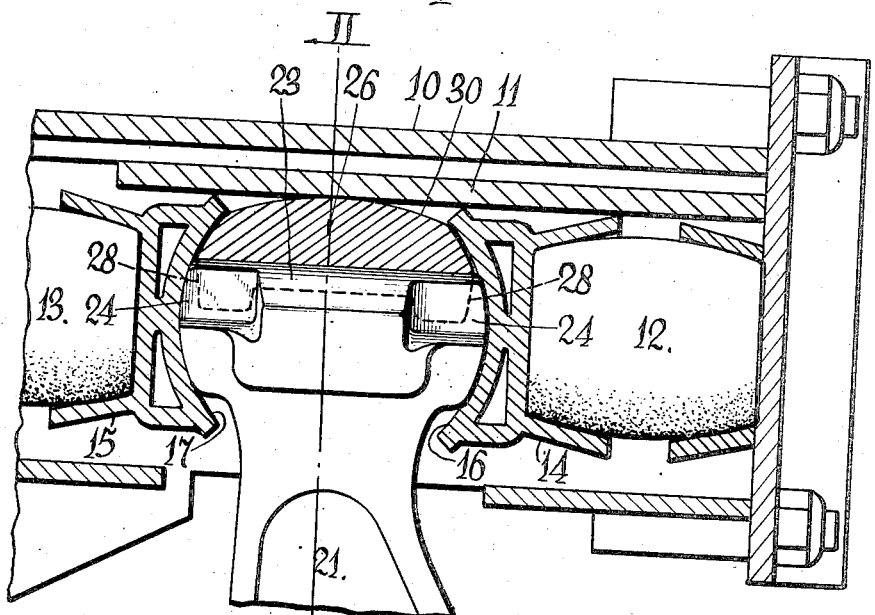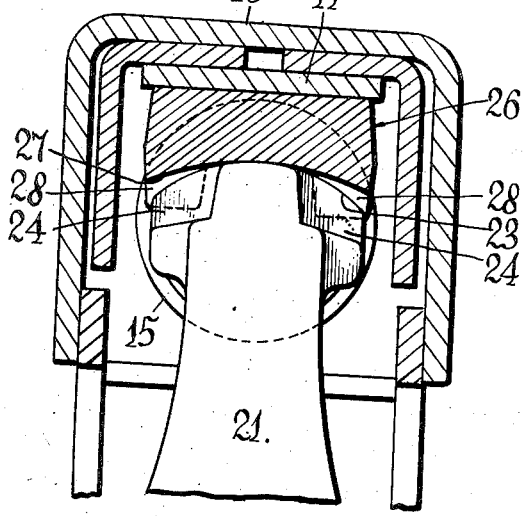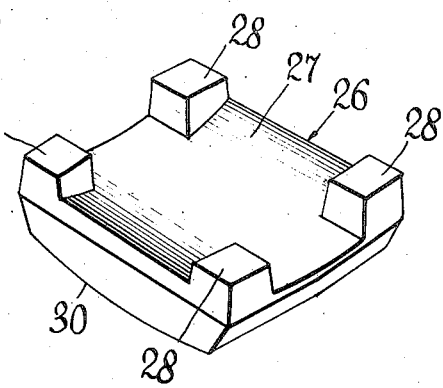

R. J. WALTER 2,829,904

ROCKER BEARING SUPPORT FOR VEHICLE SUSPENSION APPARATUS

Filed May 18, 1956

INVENTOR.
Robert J. Walter,
BY
Bean, Brooks, Buckley & Bean.
ATTORNEYS.

United States Patent Office 2,829,904
Patented Apr. 8, 1958

2,829,904
ROCKER BEARING SUPPORT FOR VEHICLE SUSPENSION APPARATUS

Robert J. Walter, Kenmore, N. Y., assignor to Truck Equipment Co., Inc., Buffalo, N. Y.

Application May 18, 1956, Serial No. 585,869

11 Claims. (Cl. 280—104.5)

This invention relates to wheel suspensions for vehicles and more particularly to a load bearing support or bearing arrangement for transmitting the load of the vehicle body and frame to one or more axle housings or members.

The load bearing support or bearing of the present invention is particularly applicable to a tandem vehicle wheel suspension of the type shown and described in my copending application, Serial No. 490,917, filed February 28, 1955, although the principles thereof may be employed in vehicle suspensions of other types. In the type of suspension shown in my prior filed copending application, identified above, a walking beam member at each side of the vehicle extends longitudinally of the vehicle with the vehicle frame and body resting on the walking beam members generally centrally thereof and with the opposite ends of the walking beam members in turn resting on the tandem axles.

The arrangement of the present invention is concerned primarily with the connections between the ends of the walking beam members and the tandem axles upon which they rest and more particularly with bearing means for this purpose wherein certain essential rocking movements are provided and wherein relative intersliding movement of the bearing parts in generally horizontal directions, both longitudinally of the vehicle and transversely, are positively limited by means incorporated directly in the bearing structure.

The rocking or sliding bearing connection of the present invention, by means of which the vehicle load is applied to axle members, is extremely simple and rugged and still provides for accurately controlled and guided relative rocking movements of a precise relationship and degree between the ends of the axles and the means for applying the vehicle load thereto. Furthermore, the construction is such that no provision need be made for lubrication despite the relatively severe loads to which such bearing supports are subjected and despite the precise requirements as to relative longitudinal and transverse rocking movements of the respective parts.

The arrangement of the present invention is simple and economical to manufacture. Close fits and tolerances are to a great extent eliminated or minimized and assembly and disassembly is extremely simple. Thus the maintenance of the present tandem axle suspension is also rendered more economical and convenient than in comparable prior art suspensions.

In the form of the present invention set forth in detail herein by way of example, each end of each of the aforesaid walking beam members opens downwardly to receive an upwardly projecting arm connected to a registering end of one of the tandem axles. Such upwardly projecting arm is received between a pair of resilient members which are in alinement therewith longitudinally and appropriately supported in the walking beam member. This general construction is fully illustrated and described in my aforesaid pending application.

Since the present invention is concerned entirely with the bearing means acting between the upper ends of the axle connected rock arms and the associated ends of the walking beam members, the description and drawing of the present invention are limited substantially thereto and reference may be had to my aforesaid pending application for disclosure of a complete tandem axle suspension which may embody the rocker bearing invention of the present application.

A single specific embodiment of the principles of the present invention is shown in the accompanying drawings and described in detail in the following specification. However, it is to be understood that such embodiment is set forth by way of example only and that various mechanical modifications may be made within the scope of the present invention, such scope being limited only as defined in the appended claims.

In the drawing:

Fig. 1 is a fragmentary longitudinal cross-sectional view taken on a vertical plane through one end of one of the walking beam members of a tandem vehicle suspension of the type illustrated and described more fully in my aforesaid copending application, showing one form of the rocker bearing means of the present invention;

Fig. 2 is a fragmentary cross-sectional view on the line II—II of Fig. 1;

Fig. 3 is a perspective view of the intermediate rocker bearing member of Figs. 1 and 2, shown upside down for clearer illustration.

Figure 4:
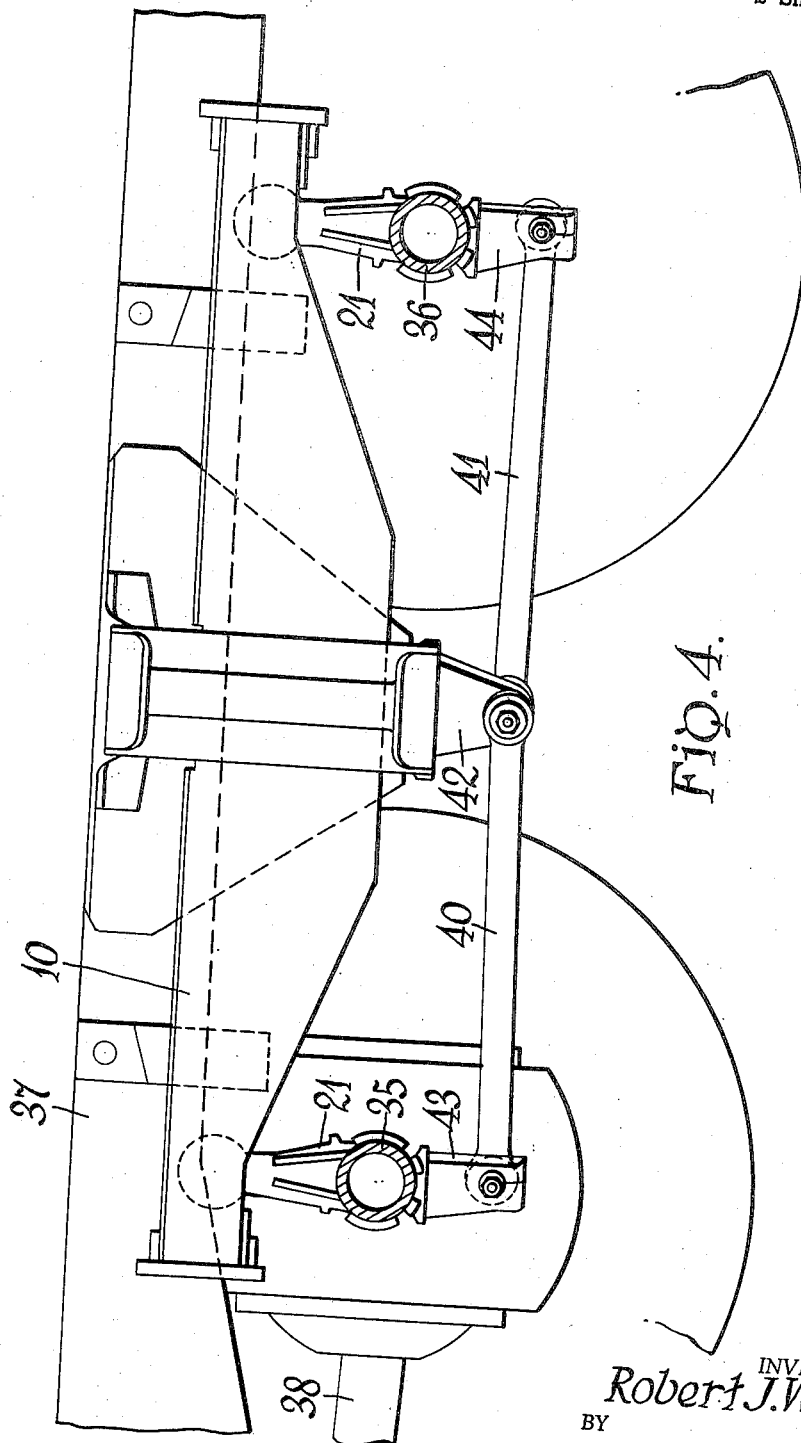
Fig. 4 is a general side elevational view of one form of tandem rear axle construction employing the rocker bearing means of the present invention.

In view of the fact that the present invention concerns only a detailed portion of a vehicle suspension means, and in the interests of simplicity and clarity of understanding, detailed reference will be had herein only to the detailed improvement of the present invention and so much of the immediately surrounding construction as is necessary and convenient to a full understanding of the invention. It is to be understood that, by way of example, all of the complete suspension system not illustrated herein may be identical with that shown and described in the aforesaid pending application.

Referring to Figs. 1 and 2 of the present drawing, the numeral 10 designates an end portion of a downwardly facing channel member which corresponds to the channel members 24 and 25 of Figs 1 and 2 of the aforesaid application or the member 175 of the embodiment of Figs. 8 through 10 of the aforesaid application. A downwardly facing bearing plate 11 corresponds to the downwardly facing bearing plate 210 of Fig. 8 of my prior application and is in fact identical therewith.

The numerals 12 and 13 designate a pair of longitudinally compressible rubber or similar cushioning members which are identical with the corresponding members 203 and 204 of Fig. 8 of the aforesaid application and the facing ends of the cushioning members 12 and 13 fit into seat members 14 and 15 which are identical with and correspond to seat members 197 and 198 of Fig. 8 of the aforesaid application. The seat members 14 and 15 are provided with concave facing surfaces 16 and 17 which engage the front and rear ends of the upper portions of the rock arms of the present invention in substantially the same manner as in the previous application.

In Figs. 1 and 2 the numeral 21 designates an upwardly extending rock arm member corresponding to the rock arm members 70 and 190 of the two embodiments in the aforesaid pending application, the lower portions of these members being fixed to the ends of the axles as clearly shown in Fig. 2 of the aforesaid pending application, as by welding directly to the axles or by U-bolt connections or otherwise.

We come now to the specific bearing means by which the upper end of each rock arm 21 is associated with an end of a walking beam member by engaging in the downwardly facing channel 10 thereof.

As shown in Figs. 1 and 2, the upper end of each rock arm 21 is somewhat enlarged and is curved at its front and rear surfaces to fit the concave faces 16 and 17 of seat members 14 and 15. The upper surface of rock arm 21 is arcuately convex as indicated at 23, as viewed from the end as in Fig. 2, such upper surface thus comprising a portion of the surface of a cylinder. The four corners of this cylindrical upper surface of the enlarged upper end of each rock arm 21 are notched or recessed downwardly as indicated at 24, whereby the remaining arcuate upper surface 23 is cruciform as viewed in plan.

An intermediate coacting rocker bearing member designated generally by the numeral 26 acts between the arcuate upper surface 23 of each rock arm 21 and the flat downwardly facing bearing surface of each bearing plate 11. The under surface of each rocker bearing member 26 is arcuately concave as viewed from the end, such surface being designated 27 and having a larger radius of curvature than the coacting upper arcuate surface 23 of the rock arm 21.

Each of the four corners of the arcuate lower surface 27 of each rocker bearing 26 is provided with a downwardly projecting lug 28, the lugs being received in the notches or recesses 24 of the rock arms 21. The lugs 28 are so located and proportioned that they provide for precisely limited relative horizontal shifting movements, both longitudinally and transversely, as between the upper end of rock arm 21 and rocker bearing 26.

The upper surface of each rocker bearing 26 which engages the lower bearing surface of a bearing plate 11 is arcuately convex as viewed in side elevation, as indicated at 30 in Fig. 1, such surface likewise comprising a portion of the surface of a cylinder.

It will be noted that the rocker bearing 26 is somewhat shorter as viewed in side elevation in Fig. 1 than the enlarged upper end of rock arm 21, whereby the primary cushioning engagement of the concave surfaces 16 and 17 is against the rock arm surfaces, relative longitudinal shifting of the rocker bearing 26 relative to the rock arm being limited by the lugs 28.

Fig. 4 is a side elevational view showing channel member 10 corresponding to the channel members 24 and 25 of my above-identified copending application and the rock arms previously described and designated 21 are shown fixed to tandem axle members 35 and 36. In Fig. 4 the numeral 37 designates a chassis or frame portion of a vehicle body, the weight of which is applied to the beam or channel members 10 at the midpoints of the latter as illustrated and described in detail in the aforesaid copending application.

In Fig. 4 the drive shaft or torque tube is designated 38, the lefthand axle 35 being a drive axle and the righthand axle 36 being a trailing or dead axle. In Fig. 4 the numerals 40 and 41 designate control links extending from a vehicle frame connected bracket 42 to arms 43 and 44 fixed to and depending from the axles 35 and 36.

I claim:

1. A load supporting rocker bearing perch for vehicle wheel suspensions comprising a vehicle frame connected member, an underlying vehicle wheel connected member, and an intermediate rocker bearing member, the upper surface of said intermediate member being arcuately convex in one direction for rocking engagement with said frame connected member, the abutting surfaces of the rocker bearing member and the wheel connected member being concavo-convex in a direction substantially at right angles to the aforesaid convexity of the upper surface of the rocker member, said abutting surfaces having interfitting projections and recesses for limiting relative horizontal intersliding movement thereof.

2. A load supporting rocker bearing porch for vehicle wheel suspensions comprising a vehicle frame connected member, an underlying vehicle wheel connected member, and an intermediate rocker bearing member, the upper surface of said intermediate member being arcuately convex about an axis extending transversely of the vehicle for rocking engagement with said frame connected member, the abutting surfaces of the rocker bearing member and the wheel connected member being concavo-convex about axes extending longitudinally of the vehicle, said abutting surfaces having interfitting projections and recesses for limiting relative horizontal intersliding movement thereof.

3. A load supporting rocker bearing perch for vehicle wheel suspensions comprising a vehicle frame connected member, an underlying vehicle wheel connected member, and an intermediate rocker bearing member, the upper surface of said intermediate member being arcuately convex in one direction for rocking engagement with said frame connected member, the downwardly abutting surface of the rocker bearing member being concave and face of the rocker bearing member being concave and the coacting upper abutting surface of the wheel connected member being convex, both in a direction substantially at right angles to the aforesaid convexity of the upper surface of the rocker member, said abutting surfaces having interfitting projections and recesses for limiting relative horizontal intersliding movement thereof.

4. A wheel suspension for vehicles comprising a vehicle frame connected member having a downwardly facing chamber and a wheel axle connected member adapted to project upwardly from the end of an axle into said chamber, said chamber including a relatively flat downwardly facing bearing surface, said axle connected member having an upper end surface which is convexly arcuate as viewed endwise of the vehicle and rectilinear as viewed in side elevation, said axle connected member upper end surface having downwardly extending recesses at its four corners, an intermediate bearing member disposed vertically between said downwardly facing chamber bearing surface and said axle connected member upper end surface, said intermediate bearing member having an arcuately convex upper surface as viewed in side elevation and an arcuately concave lower surface as viewed in end elevation, said lower surface having a radius of curvature greater than the radius of curvature of the abutting upper end surface of the axle connected member, said intermediate bearing member having downwardly projecting lugs at its four corners for engagement in the corner recesses of the axle connected member to provide limited relative longitudinal and lateral horizontal relative movement between the intermediate bearing member and its axle connected member.

5. A wheel suspension for vehicles comprising a vehicle frame connected member having a downwardly facing chamber and a wheel axle connected member adapted to project upwardly from the end of an axle into said chamber, said chamber including a relatively flat downwardly facing bearing surface, said axle connected member having an upper end surface which is convexly arcuate in one direction and rectilinear in a direction at right angles to said one direction, said axle connected member upper end surface having downwardly extending recesses at its four corners, an intermediate bearing member disposed vertically between said downwardly facing chamber bearing surface and said axle connected member upper end surface, said intermediate bearing member having an arcuately convex upper surface at right angles to the arcuate convexity of the upper end surface of the axle connected member and an arcuately concave lower surface in alinement with the arcuate convexity of the axle connected member, said lower surface having a radius of curvature greater than the radius of curvature of the abutting upper end surface of the axle connected member, said intermediate bearing member having downwardly projecting lugs at its four corners for engagement in the corner recesses of the axle connected member to provide limited relative longitudinal and lateral horizontal relative movement between the intermediate bearing member and its associated rock arm.

6. A load supporting rocker bearing perch for vehicle wheel suspensions comprising a vehicle frame connected member, an underlying vehicle wheel connected member, and an intermediate rocker bearing member, the upper surface of said intermediate member and the contiguous surface of the frame connected member having rocker bearing surfaces for relative rocking engagement in a longitudinal vertical plane, the abutting surfaces of the rocker bearing member and the wheel connected member having rocker bearing engagement in a transverse vertical plane, said abutting surfaces having interfitting projections and recesses for limiting relative horizontal intersliding movement thereof.

7. A load supporting rocker bearing perch for vehicle wheel suspensions comprising a vehicle frame connected member, an underlying vehicle wheel connected member, and an intermediate rocker bearing member, the upper surface of said intermediate member and the contiguous surface of the frame connected member having rocker bearing surfaces for relative rocking engagement in a vertical plane, the abutting surfaces of the rocker bearing member and the wheel connected member having rocker bearing engagement in a vertical plane at right angles to the rocking engagement plane of the upper surface of the rocker bearing member, said abutting surfaces having interfitting projections and recesses for limiting relative horizontal intersliding movement thereof.

8. A wheel suspension for vehicles comprising a vehicle frame connected member having a downwardly facing chamber and a wheel axle connected rock arm member adapted to project upwardly from the end of an axle into said chamber, said chamber including a relatively flat downwardly facing bearing surface, said axle connected member having an upper end surface which is convexly arcuate as viewed endwise of the vehicle and rectilinear as viewed in side elevation, an intermediate bearing member disposed vertically between said downwardly facing chamber bearing surface and said axle upper end surface, said intermediate bearing member having a convex upper surface as viewed in side elevation and an arcuately concave lower surface as viewed in end elevation, said lower surface having a radius of curvature greater than the radius of curvature of the abutting upper end surface of the rock arm, said rock arm upper surface and said intermediate bearing member having interfitting projections and recesses to provide positively limited relative longitudinal and lateral horizontal relative movement between the intermediate bearing member and its associated rock arm.

9. A wheel suspension for vehicles comprising a vehicle frame connected member having a downwardly facing chamber and a wheel axle connected rock arm member adapted to project upwardly from the end of an axle into said chamber, said chamber including a relatively flat downwardly facing bearing surface, said axle connected member having an upper end surface which is convex as viewed endwise of the vehicle and rectilinear as viewed in side elevation, said rock arm upper end surface having downwardly extending recesses at its four corners, an intermediate bearing member disposed vertically between said downwardly facing chamber bearing surface and said axle upper end surface, said intermediate bearing member having a convex upper surface as viewed in side elevation and a concave lower surface as viewed in end elevation, said intermediate bearing member having downwardly projecting lugs at its four corners for engagement in the corner recesses of the rock arms to provide limited relative longitudinal and lateral horizontal relative movement between the intermediate bearing member and its associated rock arm.

10. A load supporting rocker bearing perch for vehicle wheel suspensions comprising a vehicle frame connected member, an underlying vehicle wheel connected member, and an intermediate rocker bearing member, one surface of said intermediate member being arcuately convex in one direction for rocking engagement with one of said connected members, the abutting surfaces of the rocker bearing member and the other of said connected members being concavo-convex in a direction substantially at right angles to the convexity of said one surface of said intermediate rocker bearing member, said abutting surfaces having interfitting projections and recesses for limiting relative horizontal intersliding movement thereof.

11. A load supporting rocker bearing perch for vehicle wheel suspensions comprising a vehicle frame connected member, an underlying vehicle wheel connected member, and an intermediate rocker bearing member, one surface of said intermediate member being arcuately convex about an axis extending transversely of the vehicle for rocking engagement with one of said connected members, the abutting surfaces of the rocker bearing member and the other of said connected members being concavo-convex about axes extending longitudinally of the vehicle, said abutting surfaces having interfitting projections and recesses for limiting relative horizontal intersliding movement thereof.

References Cited in the file of this patent

UNITED STATES PATENTS

| | | |
|---|---|---|
| 1,891,642 | Harrison | Dec. 20, 1932 |

FOREIGN PATENTS

| | | |
|---|---|---|
| 1,068,608 | France | Feb. 10, 1954 |